Oct. 14, 1924. 1,511,539
M. A. SUAREZ
CONTAINER
Filed Jan. 16, 1924
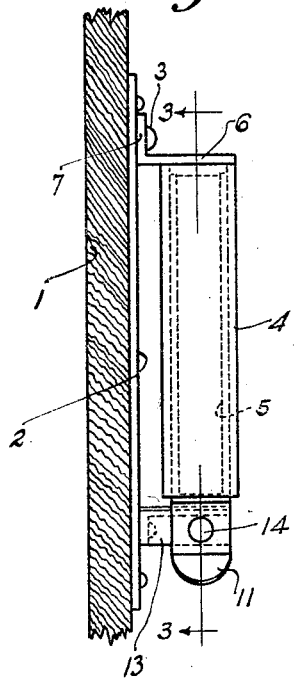
Fig.1
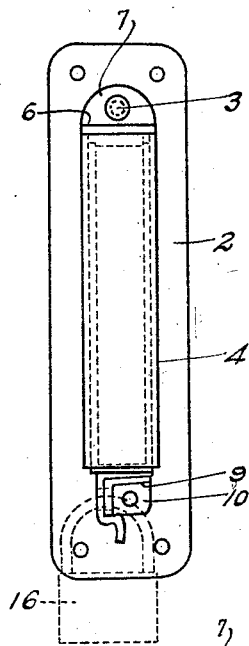
Fig.2
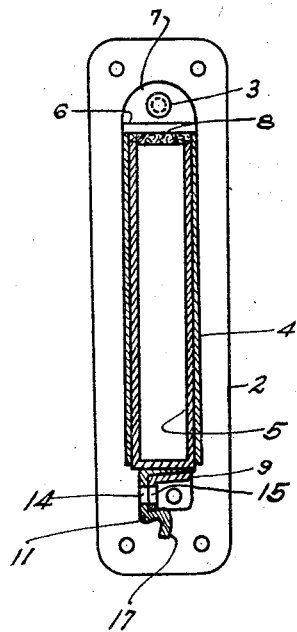
Fig.3
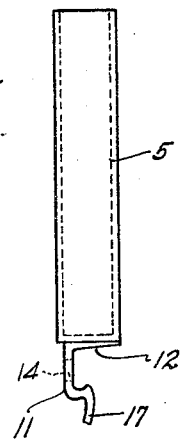
Fig.5
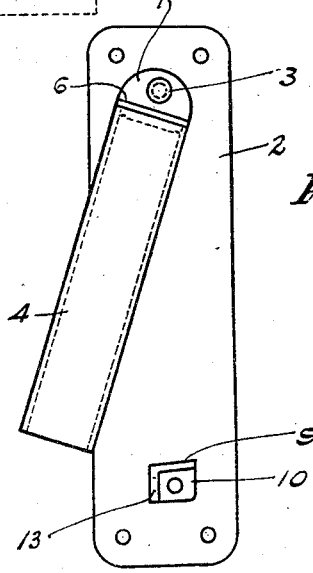
Fig.4
Inventor
M. A. SUAREZ.
By
Attorney Patented Oct. 14, 1924.

1,511,539

UNITED STATES PATENT OFFICE.

MURRELL A. SUAREZ, OF BIRMINGHAM, ALABAMA.

CONTAINER.

Application filed January 16, 1924. Serial No. 686,670.

*To all whom it may concern:*

Be it known that I, MURRELL A. SUAREZ, a citizen of the United States of America, residing at Birmingham, in the county of Jefferson and State of Alabama, have invented certain new and useful Improvements in Containers, of which the following is a specification.

My invention relates to an automobile accessory in the form of a water-proof carrying case adapted for attachment to the dash or any other convenient part in the automobile and which will serve as a receptacle or holder for license records, identification tags, ownership certificates, or the like such as may be necessary or desirable for an automobile owner to carry with him, particularly when touring.

More particularly, the object of my invention is to design a very simple and effective water-proof receptacle which can be manufactured at relatively small expense, will be attractive in appearance, can be locked in closed position to protect its contents from theft, and which will positively protect its contents from moisture.

My invention contemplates the pivotal mounting on a suitable backing plate of a tubular cover member open at its lower end and having a suitable washer or packing at its upper closed end, in combination with a removable tubular receptacle open only at its upper end and adapted to telescope into the cover member and to be engaged and interlocked with a staple plate which preferably acts to wedge the receptacle's open end against the packing or washer and thus sealing it to positively prevent access of moisture to its contents.

My invention will be better understood, in its preferred embodiment only, by reference to the accompanying drawings which form a part of this specification, and in which:—

Fig. 1 is a side elevation of the receptacle showing the dash in cross-section.

Fig. 2 is a front view of the device with a lock shown in dotted lines.

Fig. 3 is a cross-sectional view taken on the line 3—3 of Fig. 1.

Fig. 4 is a detail view of the mounting plate and the cover member; and

Fig. 5 is a detail view of the removable receptacle.

Similar reference numerals refer to similar parts throughout the drawings.

In the embodiment of my invention illustrated, I show an automobile dash 1 to which a suitable backing plate 2 is attached in any desired manner. Near the upper end of this plate I mount by any suitable pivot 3, a swinging tubular cover member 4 for the inner tubular receptacle 5. The cover is closed fluid tight at its upper end by a plate 6 which has its end 7 bent outwardly at an angle to receive the pivot 3 and to support the body of the cover free to swing clear of the plate 2. I mount in the upper or closed end of the cover 4 a washer or packing 8 and the open upper end of the receptacle 5 is adapted to be forced with a water tight joint against this packing when the receptacle has been telescoped into the cover and its lower closed end has been forced against the bevelled edge 9 of a staple plate 10, which is rigidly attached to the lower part of the plate 2.

A suitable latch or lock means should be provided to hold the receptacle in the cover. I show a spring latch member 11 attached to the closed bottom end of the receptacle 5. The end 12 of the latch, which is attached to the receptacle, may be bevelled to take the wear against the bevelled face 9 of the staple plate. The spring latch is adapted to snap over the side 13 of the staple plate 10 and to latch the parts in the assembled position shown in Figs. 1 to 3. When in this position the hole 14 in the latch registers with the hole 15 in the staple plate and these are adapted to receive a lock 16, if it is desired to positively lock the receptacle in place. The lower end 17 of the spring catch is downturned to form a finger grip by which it can be conveniently unlatched and the latch serves as a means for pulling the receptacle out of the cover.

In operation, the cover 4 is swung to the left to clear the staple plate, the receptacle 5 is pulled out and whatever article is to be placed therein is introduced and the receptacle inserted again in the cover and swung with the latter towards the staple plate until the latch 11 engages and interlocks with the latter. In so interlocking the taper wall 9 forces the receptacle upwardly into the cover until it has water tight engagement with the washer 8. This wedging action also serves to hold the two elements in anti-rattling engagement, in which position they can be secured by a lock if desired.

Obviously the particular shape or size of the telescoping cover and receptacle may be varied according to the article to be stored, and the material used may be any suitable for the purposes contemplated.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A device of the character described, comprising a tubular outer member closed overhead, a receptacle adapted to telescope into said member and having its lower end closed, a staple fixedly mounted adjacent to said member, and means to latch the receptacle and outer member in assembled position to said staple.

2. A device of the character described, comprising a mounting plate, a tubular outer member closed overhead, means to pivotally support said member from its closed end, a receptacle adapted to telescope into said member and having its lower end closed, a staple on said mounting plate, and means to latch the receptacle and outer member in assembled position to said staple.

3. In a device of the character described, a mounting plate, a tubular member having a closed end hingedly connected to said plate, a receptacle adapted to telescope into the open end of said tubular member, a staple fixed on the mounting plate and having a wedge surface which the closed end of said receptacle is adapted to engage, as and for the purposes described, when the device is assembled and moved to its operating position.

In testimony whereof I affix my signature.

MURRELL A. SUAREZ.

Witness:
NOMIE WELSH.